C. A. CHAMBERLIN.
Anchors.

No. 142,769.  Patented September 16, 1873.

Witnesses
R. E. Henderson,
James D. Kay

Inventor
Charles A. Chamberlin
by Bakewell Christy & Kerr
his attys.

UNITED STATES PATENT OFFICE.

CHARLES A. CHAMBERLIN, OF PHILADELPHIA, PENNSYLVANIA.

IMPROVEMENT IN ANCHORS.

Specification forming part of Letters Patent No. 142,769, dated September 16, 1873; application filed July 11, 1873.

*To all whom it may concern:*

Be it known that I, CHARLES A. CHAMBERLIN, of Philadelphia, in the county of Philadelphia and State of Pennsylvania, have invented a new and useful Improvement in Anchors; and I do hereby declare the following to be a full, clear, and exact description thereof, reference being had to the accompanying drawing forming a part of this specification, in which—

Figure 1:
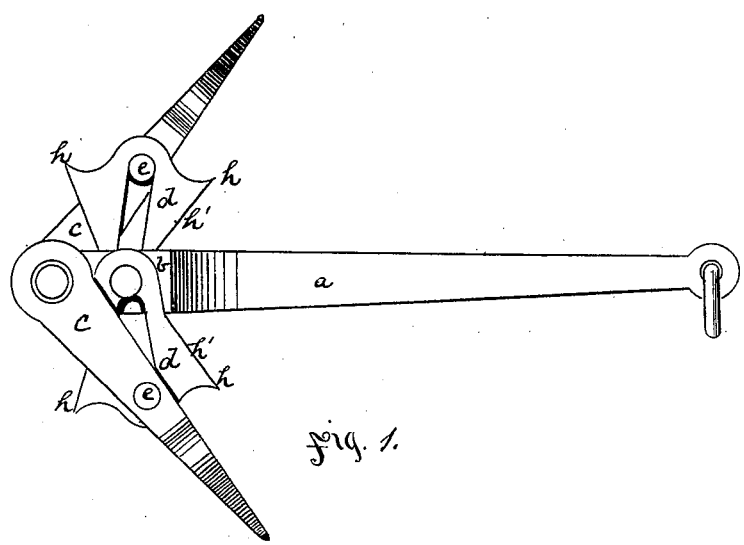
Figure 2:
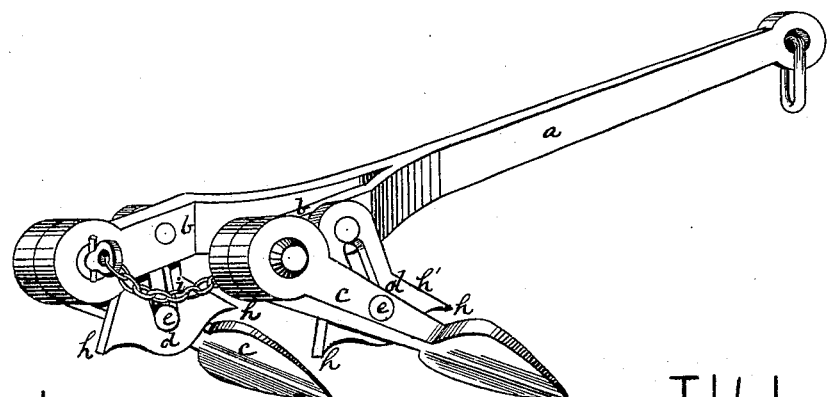

Figure 1 is a side view of my improved anchor, illustrating the independent action of the flukes; and Fig. 2 is a perspective view of the same.

Like letters of reference indicate like parts in each.

My invention relates to an improvement in that class of ships' anchors which have oscillating flukes; and it consists in attaching the flukes in such a way that they will operate independently of each other. It also consists in the attachment to each fluke of a yoke, which limits its oscillation, and acts as a tripper to throw down and hold its point at an angle of penetration; and of a flexible connection between the arms of the bifurcated shank.

To enable others skilled in the art to make and use my invention, I will describe its construction and mode of operation.

This anchor has a shank, $a$, bifurcated at its rear end, so as to form two arms, $b\ b$. Pivoted to the arms $b$ are the flukes $c$, which are disconnected from and operate entirely independently of each other. On the arms $b$, forward of the point of attachment of the flukes, I pivot a pair of yokes, $d$, one on each arm. A pin, $e$, rigidly attached to each fluke, projects into the adjacent yoke $d$, as shown in Fig. 2. These yokes, by means of their attachment thereto, limit the oscillation of the flukes $c$ to, and hold them at, any desired angle of penetration, such angle being regulated by the length of the yokes. The yokes $d$ are provided with spurs $h$, the front sides, $h'$, of which are, when the flukes are at an angle of penetration, parallel to the line of such angle. The rear spur operates as a tripper to throw down the point of the fluke, so as to cause it to penetrate the ground, and the front spur, being presented at the same angle, when the fluke is buried deep by the strain upon it, penetrates also, and thereby furnishes an additional holding-surface, and also relieves the lateral strain upon the flukes.

The flukes $c$, being independent of each other, operate independently, so that in case one cannot, from any cause, penetrate the ground and secure a hold, the other is not thereby disabled or prevented from so doing. Besides, when the vessel swings at anchor, the "off" fluke operates as a pivot, upon which the anchor turns, the near fluke being thrown out of its bite by the backward movement of the anchor in turning.

Between the arms $b$ I place a chain or other flexible connection, $i$, to prevent the cable from getting between them and fouling the anchor. In addition to this, the chain $i$ facilitates the fishing of the anchor by giving a place of attachment for the hook.

What I claim as my invention, and desire to secure by Letters Patent, is—

1. The pivoted flukes $c$, in combination with the yokes $d$, which limit their motion, substantially as described.

2. The yokes $d$, attached to the arms $b$ and flukes $c$, substantially as described, so as to limit the angle of penetration of the flukes, and provided with spurs or trippers $h$, to trip or throw down and hold the points of the flukes at an angle of penetration, substantially as described.

3. The yokes $d$, provided with spurs $h$, and so hinged and oscillating, relatively to the flukes $c$, that the front spurs $h$ shall present the same angle of penetration as the flukes, substantially as and for the purposes described.

In testimony whereof I, the said CHARLES A. CHAMBERLIN, have hereunto set my hand.

C. A. CHAMBERLIN.

Witnesses:
 I. P. DELMEY,
 JAMES PROSSITER.